(12) United States Patent
Fleck

(10) Patent No.: US 9,821,598 B2
(45) Date of Patent: Nov. 21, 2017

(54) HARD WHEEL COVER

(71) Applicant: Moochout LLC, St. Paul, MN (US)

(72) Inventor: Jonathan E. Fleck, St. Paul, MN (US)

(73) Assignee: Moochout LLC, St. Paul, MN (US)

( * ) Notice: Subject to any disclaimer, the term of this patent is extended or adjusted under 35 U.S.C. 154(b) by 0 days.

(21) Appl. No.: 15/056,700

(22) Filed: Feb. 29, 2016

(65) Prior Publication Data

US 2016/0250889 A1 Sep. 1, 2016

Related U.S. Application Data

(60) Provisional application No. 62/121,751, filed on Feb. 27, 2015.

(51) Int. Cl.
*B60B 7/06* (2006.01)
*B60B 7/04* (2006.01)
*B60B 7/00* (2006.01)

(52) U.S. Cl.
CPC .............. *B60B 7/066* (2013.01); *B60B 7/00* (2013.01); *B60B 7/04* (2013.01); *B60B 7/0013* (2013.01)

(58) Field of Classification Search
CPC ........... B60B 7/00; B60B 7/0013; B60B 7/04; B60B 7/06; B60B 7/066; B60B 7/10
USPC ...... 301/37.101, 37.102, 37.31, 37.34, 108.1
See application file for complete search history.

(56) References Cited

U.S. PATENT DOCUMENTS

| | | | | |
|---|---|---|---|---|
| 1,568,707 A * | 1/1926 | Auld | ..................... | B60B 7/0013 301/108.1 |
| 1,755,427 A * | 4/1930 | Cochran | ................... | B60B 7/10 301/108.1 |
| 5,676,430 A * | 10/1997 | Wright | ..................... | B60B 7/04 301/108.4 |
| 6,152,537 A * | 11/2000 | Wright | ..................... | B60B 7/10 301/37.31 |
| 6,378,955 B1 * | 4/2002 | Adamson | .................. | B60B 3/16 301/108.4 |
| 6,467,852 B1 * | 10/2002 | Polka | ........................ | B60B 7/12 301/108.4 |
| 7,156,470 B1 * | 1/2007 | Wright | .................. | B60B 7/0013 301/108.1 |
| 2006/0208560 A1 * | 9/2006 | Allsop | ...................... | B60B 7/00 301/108.1 |

* cited by examiner

*Primary Examiner* — Jason Bellinger
(74) *Attorney, Agent, or Firm* — Polsinelli PC

(57) ABSTRACT

Aspects of the present disclosure involve a wheel cover configured to streamline a wheel of a motor vehicle. In one implementation, the wheel cover includes a unit that mounts and dismounts to the hub of a wheel of a vehicle without brackets, bolts, and assembly kits. The wheel cover system may include a circular cover that covers the center of the wheel hub. An engaging structure may include one or more hooks opposed from each other with small access ports to facilitate mounting and dismounting of the wheel cover on the wheel hub. To cover the wheel hub, the wheel cover system is placed over the wheel hub and the four hooks are engaged to latch onto a back edge of the wheel hub. Through the simple activation of the hooks, the wheel cover system may be easily mounted and dismounted on the wheel hub.

18 Claims, 7 Drawing Sheets

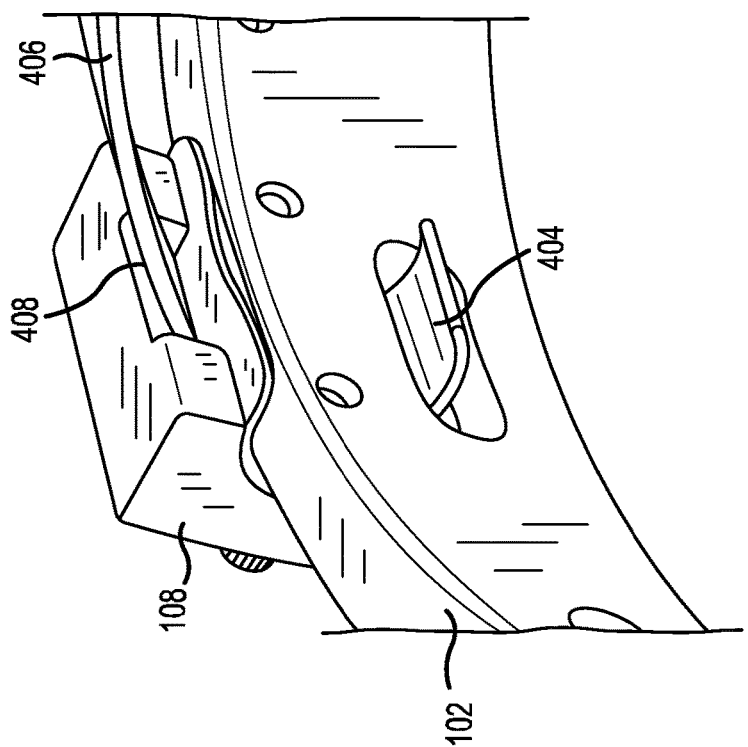
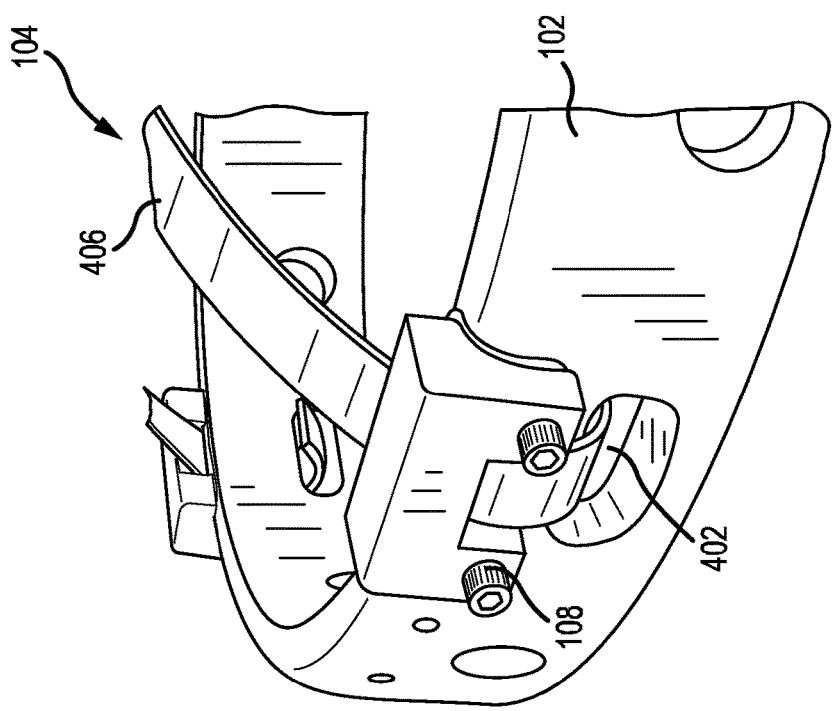
FIG.4B
FIG.4A

HARD WHEEL COVER

CROSS-REFERENCE TO RELATED APPLICATIONS

The present application claims benefit of priority under 35 U.S.C. §119 to U.S. Provisional Patent Application No. 62/121,751, entitled "ONE PIECE HARD WHEEL COVER" and filed Feb. 27, 2015, which is incorporated by reference in its entirety herein.

TECHNICAL FIELD

Aspects of the present disclosure relate to motor vehicles, and more particularly to a motor vehicle wheel cover to streamline the motor vehicle wheels.

BACKGROUND

Wheel designs for vehicles (e.g., heavy trucks, trailers, or the like) typically include a metal wheel (e.g., a rim) onto which a pneumatic tire may be mounted. Conventional wheel designs generally fail to consider the overall aesthetic appeal or aerodynamic efficiency of the wheel. Further, while some rim covers (e.g., hub caps) seek to cover unsightly aspects of the rim, such rim covers typically prevent or otherwise hinder inspection of potential problems associated with the wheel that may develop during movement. Such drawbacks are further exacerbated by requiring tools to remove conventional rim covers. It is with these issues in mind, among others, that various aspects of the present disclosure were developed

SUMMARY

One implementation of the present disclosure may take the form of a wheel cover system. The system includes a first portion comprising a mounting ring with a circumference larger than an axle cap of a wheel hub and a plurality of hooking mechanisms configured to engage a backside surface of the axle cap of the wheel hub and a second portion comprising a hub cover lying within an interior portion of the mounting ring. The first portion and the second portion are mounted onto the wheel hub through the plurality of hooking mechanisms engaging the backside surface of the axle cap of the wheel hub, the hooking mechanisms operable between an engaging position and a disengaging position through movement of a hooking mechanism support structure.

Another implementation of the present disclosure may take the form of a cover for a vehicle wheel. The cover may include a mounting ring comprising an inner surface and an outer surface with a circumference larger than an axle cap of a wheel hub of a vehicle, a hub cover lying within the inner surface of the mounting ring, and a plurality of hooking mechanisms disposed on the outer surface of the mounting ring and configured to engage a backside surface of the axle cap of the wheel hub. The mounting ring and the hub cover are mounted onto the wheel hub through the plurality of hooking mechanisms engaging the backside surface of the axle cap of the wheel hub, the hooking mechanisms operable between an engaging position and a disengaging position through movement of an engagement mechanism.

BRIEF DESCRIPTION OF THE DRAWINGS

FIG. 4A is a diagram illustrating an outer view of a hooking mechanism of the first portion of the hard wheel cover system.

FIG. 4B is a diagram illustrating an inner view of a hooking mechanism of the first portion of the hard wheel cover system.

DETAILED DESCRIPTION

Aspects of the present disclosure involve a wheel cover configured to streamline a wheel of a motor vehicle. In general, the wheel cover is mounted to the hub of an over the road truck, trailer, bus, and/or the like without the need of any tools. Stated differently, in one implementation, the wheel cover includes a unit that mounts and dismounts to the hub of a wheel of a vehicle without brackets, bolts, and assembly kits. As explained in more detail below, one or more clips or hooks may be employed to mount the wheel cover. In particular, the wheel cover system may include a circular cover that, when attached to a vehicle wheel, covers the center of the wheel hub. The circular cover may include one or more holes that provide access to the bolts of the vehicle wheel hub. An engaging structure may be placed around the circular cover to hold the cover in place against the wheel hub. In one particular embodiment, the engaging structure may include one or more hooks opposed from each other with small access ports to facilitate mounting and dismounting of the wheel cover on the wheel hub. It will be appreciated by those skilled in the art, however, that additional or fewer hooks in various orientations may be utilized to mount the wheel cover. To cover the wheel hub, the wheel cover system is placed over the wheel hub and the four hooks are engaged to latch onto a back edge of the wheel hub through a locking mechanism. In one embodiment, the hooks of the wheel cover system contact only the axel cap, not the hub to which the axel cap is mounted. Through the simple activation of the hooks as explained in more detail below, the wheel cover system may be easily mounted and dismounted on the wheel hub without the need for additional tools, brackets, bolts, or the like.

Figure 1:
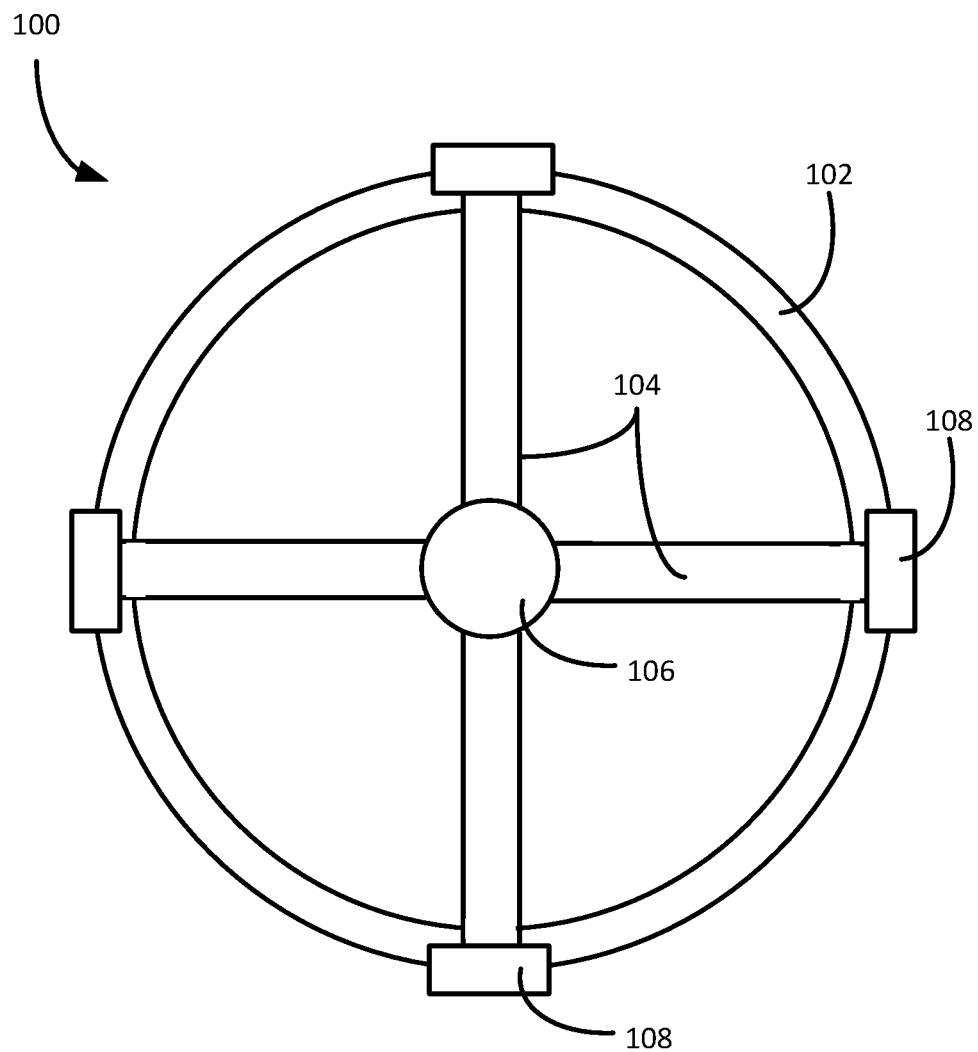
FIG. 1 is a diagram of an overhead view of a first portion of a hard wheel cover system.
Figure 2:
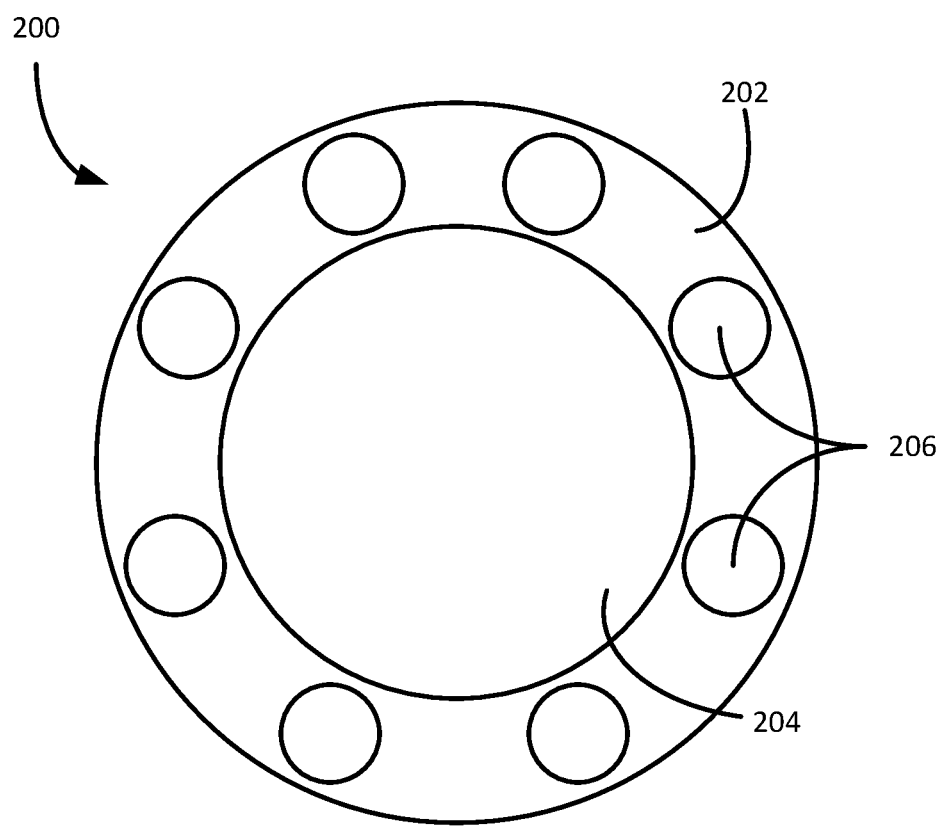
FIG. 2 is a diagram of an overhead view of a second portion of a hard wheel cover system.
Figure 3:
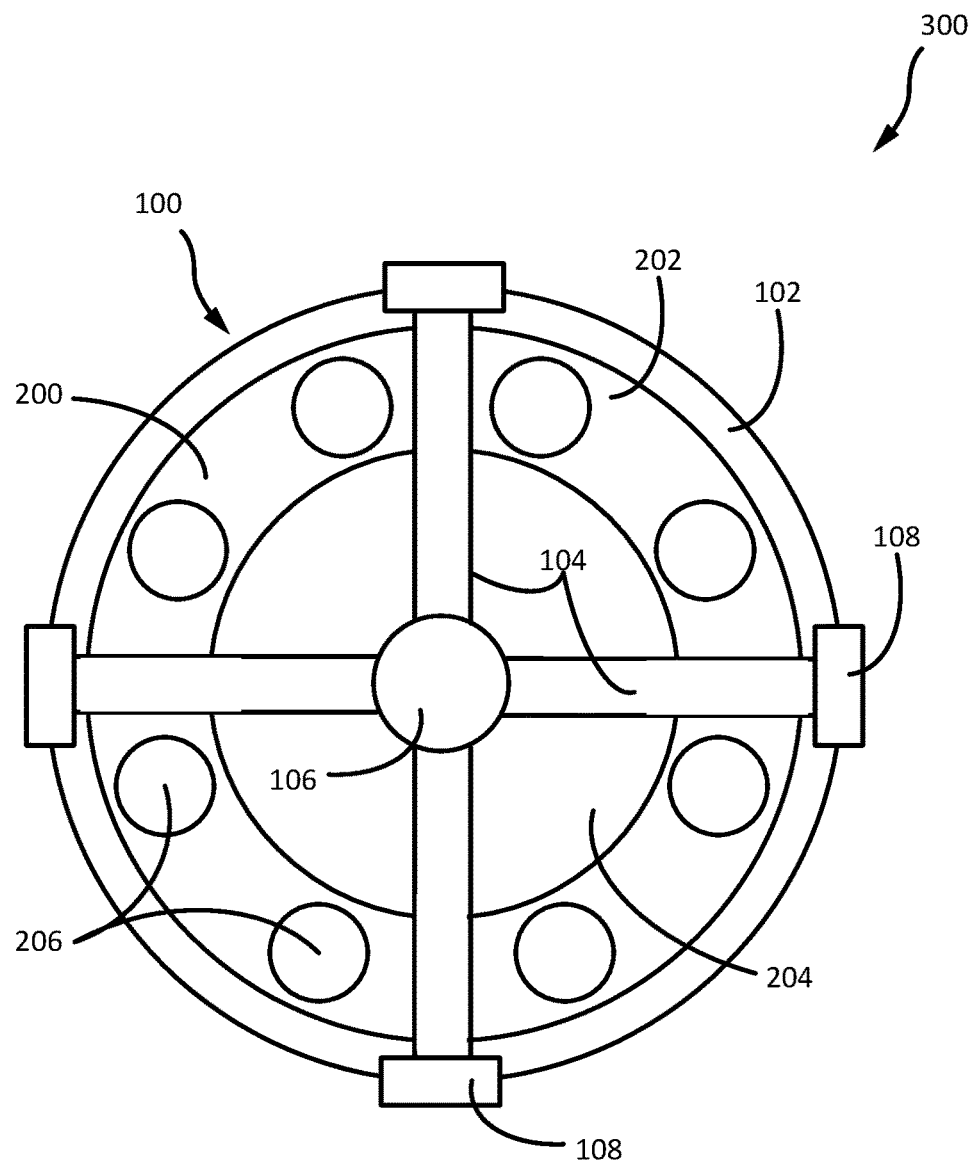
FIG. 3 is a diagram of an overhead view of the first portion mated with the second portion of the hard wheel cover system.

FIG. 1 is a diagram of an overhead view of a first portion 100 of a hard wheel cover system. FIG. 2 is a diagram of an overhead view of a second portion 200 of the hard wheel cover system. In general, the first portion 100 of the hard wheel cover system includes a mounting ring 102. As shown in FIG. 3 (which is a diagram of an overhead view of the first portion 100 mated with the second portion 200 of the hard wheel cover system 300), the mounting ring 102 of the first portion is slightly larger in diameter than the second portion of the wheel cover system to engage a wheel hub to mount the second portion against the wheel hub and cover the hub. The first portion 100 also includes four hooking mechanisms 104 opposed from each other. The hooking mechanisms 104 extend from the edge of the mounting ring 102 to the center of the ring and are held together in the center of the ring by a hooking mechanism support structure 106 or engagement apparatus. In general, the hooking mechanism support structure 106 may be any shape and size to support the hooking mechanism 104 of the first portion above the center of the mounting ring 102. In addition, each hooking mechanism 104 is held in relation to the outer portion of the mounting ring 102 through a hook bracket 108. As explained in more detail below, each hooking mechanism 104 extends through a corresponding hook bracket 108 and through a clip access hole in the mounting ring to engage a lip of the wheel hub. The operation of the hooking mechanisms 104 is discussed in more detail below in relation to FIGS. 4A-7 to mount the wheel cover system 300 to a wheel hub.

Turning now to FIG. 2, the second portion 200 of the wheel system includes a circular cover portion 204 that covers, when mounted, a center portion of a wheel hub. In general, the cover portion 204 may be made of a myriad of materials that are lightweight, rigid, and resistant to ultraviolet light, as well as the rigors of use in streamlining a wheel. On the outer edge of the cover portion 204, the second portion 200 of the wheel system includes a bolt access portion 202. The bolt access portion 202 includes one or more holes 206 that provide access to the one or more bolts of the wheel hub when the wheel cover is mounted onto the end of the wheel hub. In some embodiments, the bolt access portion 202 may not include the access holes 206 but may instead include recessed areas on the backside of the bolt access portion 202 to accommodate the now covered bolt hole circles of the axle cover 200.

As mentioned, FIG. 3 illustrates the first portion 100 of the wheel system 300 mated with the second portion 200. In particular, the first portion 100 is placed around the outer edge of the second portion 200 when the wheel cover is mounted to the wheel hub. The first portion 100 operates to latch onto a back edge of a wheel hub through the hooking mechanisms 104 and hold the second portion 200 against the wheel hub. Removal of the first portion 100 (or disengagement of the hooking mechanisms 104 from the back edge of the wheel hub allows for the removal of the first and second portion 200 of the wheel cover system. Further, the engagement and disengagement of the hooking mechanisms 104 may be conducted by a user without the need for tools or other devices. Rather, as explained below, the first portion 100 may be disengaged from the wheel hub by pulling up on the hooking mechanism support structure 106 in the center of the structure 300 to release the hooking mechanisms. Alternatively, pressing on the hooking mechanism support structure 106 engages the clips 104 around the wheel hub to hold the wheel cover system 300 in place. In one particular embodiment, the first portion 100 and the second portion 200 may be connected in some manner to form a single unit wheel cover. The single unit wheel cover embodiment may operate to connect or attach to the wheel hub in a similar manner as described below. The easy to mount and dismount system 300 may then provide an aerodynamic wheel cover for a wheel of a vehicle without the need for expensive and cumbersome mounting tools.

FIG. 4A is a diagram illustrating an outer view of a hooking mechanism 104 of the first portion 100 of the hard wheel cover system 300 and FIG. 4B is a diagram illustrating an inner view of a hooking mechanism of the first portion of the hard wheel cover system. As shown, the hooking mechanism includes a generally flat arm 406 that extends from the hooking mechanism support structure 106 in the middle of the first portion 100 to the mounting ring 102. In general, the arm 406 is curved to extend above the mounting ring 102 as the arm extends toward the hooking mechanism support structure 106 in the middle of the mounting ring. In one particular embodiment, the first portion 100 may include four arms 406 of the hooking mechanisms 104 that each connect to the hooking mechanism support structure 106 through a hinge to allow the arm to pivot about the hinge. In another embodiment, the first portion 100 may include two arms 406 that are held together in the center of the mounting ring 102 through the hooking mechanism support structure 106. Regardless of the embodiment used, the arms 406 are generally flexible enough to allow the hooking mechanism support structure 106 to move up and down relative to the mounting ring 102. In other words, the hooking mechanism support structure 106 may be maneuvered away from the mounting ring 102 above the ring or closer to the mounting ring by a user alternatingly pressing on the hooking mechanism support structure and pulling up on the hooking mechanism support structure. The movement of the hooking mechanism support structure 106 is discussed in more detail below with relation to FIGS. 5 and 6.

At the opposite ends of the arms 406 from the hooking mechanism support structure 106, the arm is curved to form a hook 404 portion. In particular, the mounting ring 102 may include a hook access hole 402 in the sidewall of the mounting ring that allows the hook portion 404 of the hooking arm to extend from outside the mounting ring through the hook access hole and into the inner portion of the mounting ring. A similar hook access hole 402 in the sidewall of the mounting ring 102 may be present for each hooking arm 406 of the wheel cover system. As shown in FIG. 4B, the hook portion 404 extends into the inner portion of the mounting ring 102 to form a hook. The hook 404 is utilized by the wheel hub cover system 300 to latch onto an edge on the backside of the wheel hub (by hooking around the backside edge) to hold the wheel cover in place over the wheel hub.

Figure 7:
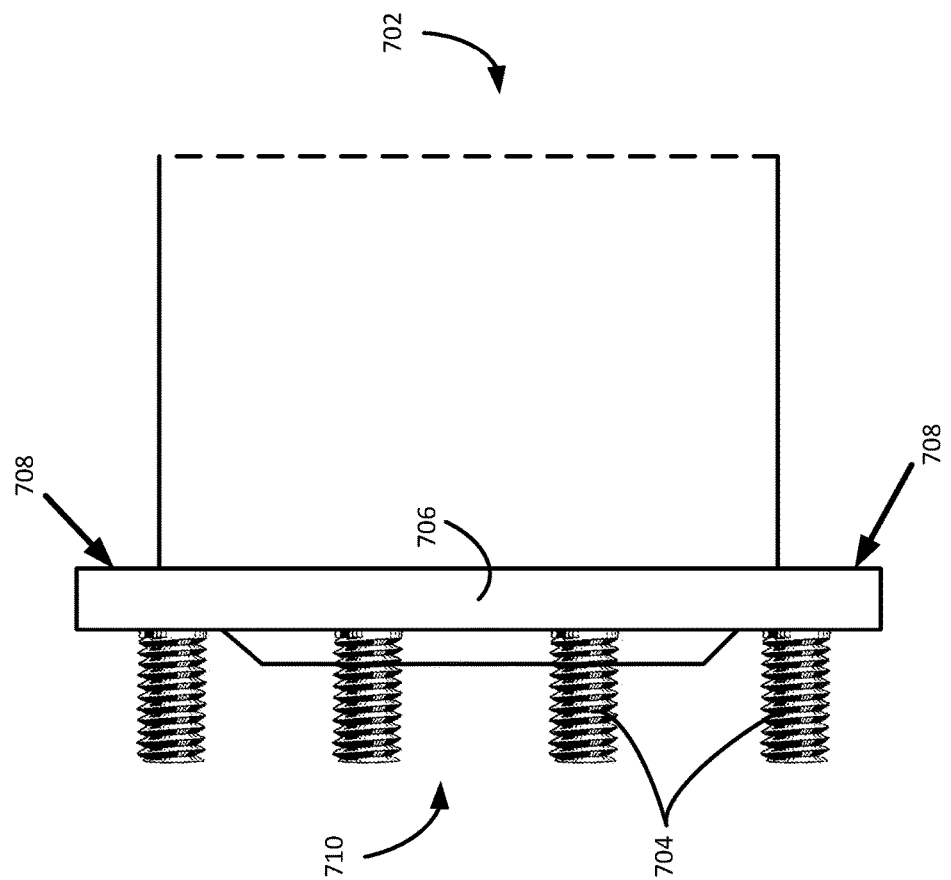
FIG. 7 is a diagram of an example hub configured to receive one or more hooks to mount a wheel cover.

In particular, FIG. 7 shows an example hub 702 configured to receive one or more hooks 404 to mount a wheel cover onto the wheel hub. The wheel hub cover discussed above would be placed over the front portion 710 the example hub 702 to cover the wheel hub. In one embodiment, the bolts 704 of the hub 702 may extend through the one or more bolt access holes 206 of the wheel cover 300. Further, once placed on the wheel hub 702, one or more of the hooks 404 described above of the wheel hub cover 300 hook onto the back edge 708 of an axle cap 706 of the wheel hub. By attaching the hooks 404 of the hooking mechanisms 104 of the wheel hub cover 300 to the backside edge 708 of the hub axle cap 706, the cover may be retained in place over the front portion of the wheel hub 710 to provide the aerodynamic cover the wheel hub.

Returning to FIGS. 4A and 4B, each arm 406 of the hooking mechanisms 104 are held in place along the edge of the mounting ring 102 by a hook bracket 108. In general, the hook bracket is a rectangular-shaped bracket that is attached to the outer surface of the mounting ring 102. In one particular embodiment illustrated in FIG. 4A, the hook bracket 108 is attached to the outer surface of the mounting ring 102 through one or more screws. However, the hook bracket 108 may be attached to the mounting ring 102 through any known or hereafter developed attachment mechanisms. As mentioned, the hook bracket 102 operates to maintain the arms 406 of the hooking mechanisms 104 in place along the mounting ring 102 so that the hook portion 404 of the arm extends through the hook access holes 402. However, the hook bracket 108 is constructed such that the arms 406 are not themselves attached to the mounting ring 102. Rather, each hook bracket 108 may include a groove 408 through which the arms 406 may slide along during attachment of the cover system 300 to the wheel hub. As explained in more detail below, the arms 406 of the hooking mechanisms 104 of the wheel cover system 300 may move when the hooking mechanism support structure 106 is pressed or pulled. This action moves the hook portion 404 of the arms 406 to engage (or hook onto) the backside edge 708 of the wheel hub to lock the cover in place over the wheel hub. The groove 408 through the hook bracket 108 provides a path along which the arm 406 slides during the engagement and disengagement of the cover over the wheel hub.

Figure 5:
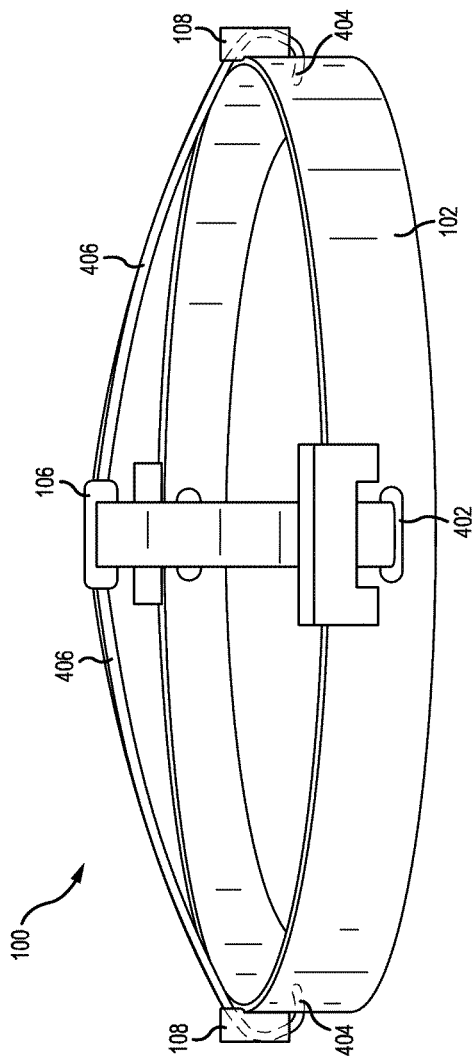
FIG. 5 is a diagram illustrating the first portion of the hard wheel cover system in an unlocking position.

FIG. 5 is a diagram illustrating the first portion 100 of the hard wheel cover system in an unlocking position. As mentioned, the first portion 100 operates to attach to the wheel hub to hold the first portion and the second portion 200 against the wheel hub as a cover. The first portion 100 attaches to the wheel hub by orienting one or more hooks 404 of a hooking mechanism 104 around a backside edge 708 of an axle cap 706 of the wheel hub 702. To engage and disengage the hooks 404 against the backside edge 708, the hooking mechanism support structure 106 is moved up and down (or toward the mounting ring 102 and away from the mounting ring). The movement of the hooking mechanism support structure 106 causes the arms 406 of the hooking mechanisms 406 to slide within the hook brackets 108 to bias the hooks 404 against the backside edge 708 or away from the backside edge. In particular, when the hooking mechanism support structure 106 is in the up position (or away from the mounting ring 102), the arms 406 of the hooking mechanisms 406 are similarly pulled away from the mounting ring. This movement in turn retracts the hook portion 404 of the arms at least partially through the hook access holes 402. In this position, the first portion 100 may be oriented around the axle cap 706 of the wheel hub 702 as the hooks 404 are retracted into the hook access holes 402. As mentioned above, the arms 406 are free to slide along the groove 408 of the hook bracket 108 to facilitate the retraction of the hook portions 404.

Figure 6:
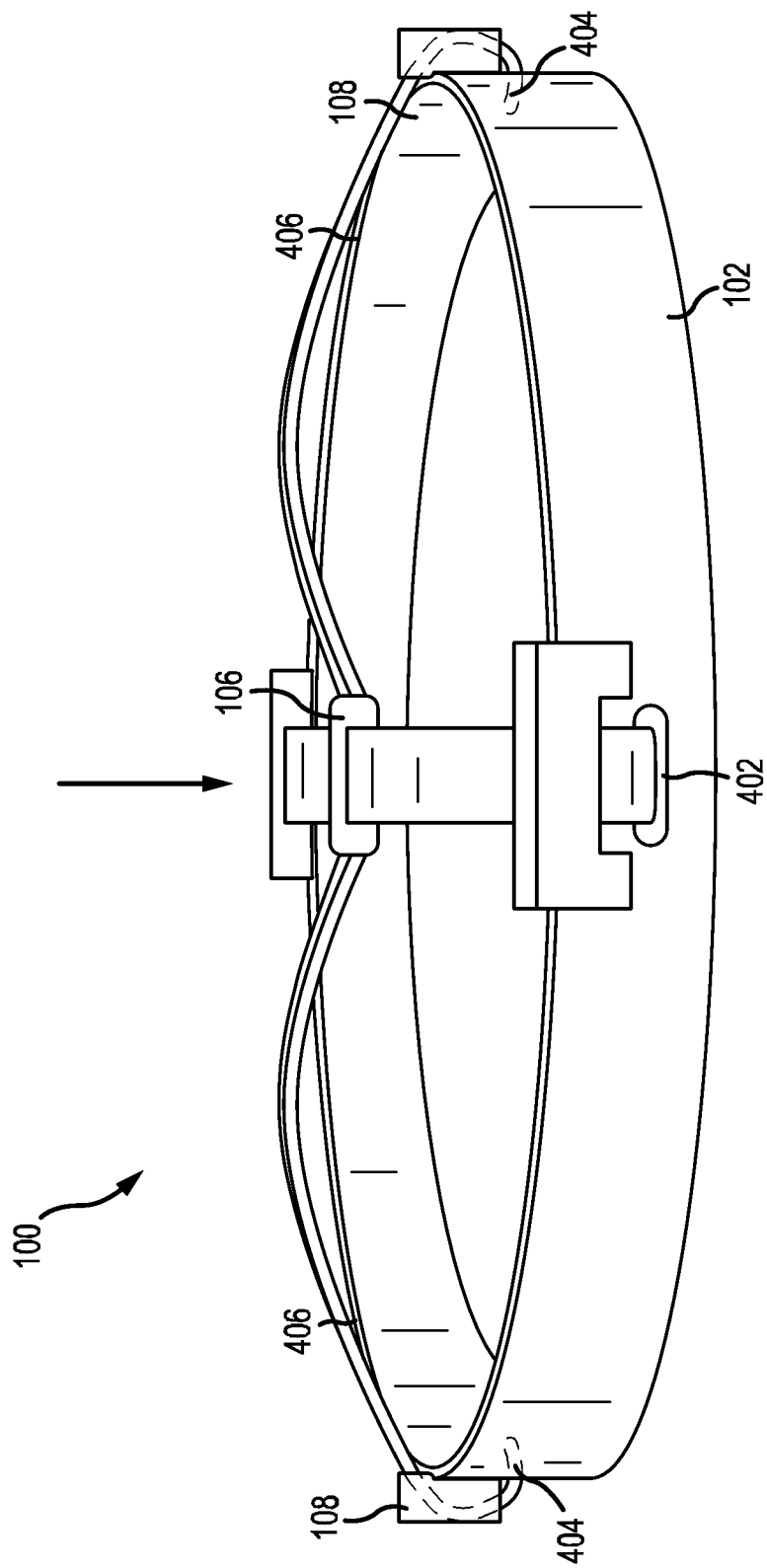
FIG. 6 is a diagram illustrating the first portion of the hard wheel cover system in a locking position.

Once oriented around the axle cap 706 of the wheel hub 702, the hooking mechanism support structure 106 may be pressed down (or toward the middle of the mounting ring 102) to engage the hooks along the backside surface 708 of the hub axle cap 706. In particular, FIG. 6 is a diagram illustrating the first portion 100 of the hard wheel cover system in a locking position. As shown, pressing down on the hooking mechanism support structure 106 causes the arms 404 of the hooking mechanism 106 to bend as they are held in place against the mounting ring 102 by the one or more hook brackets 108 (while also allowing the arms to at least partially slide along the groove 408 of the bracket). The bending of the arms 404 further causes the hook portion 404 at the end of the arms to be pulled through the corresponding hook access holes 402 and upward toward the top edge of the mounting ring 102. When the second portion 200 and the first portion 100 are mated, the hooking mechanism support structure 106 may be pressed toward the second portion until the hooking mechanism support structure rests or is otherwise near the center of the second portion. Further, the movement of the hooks 404 through the hook access holes 402 causes the hooks to engage along the backside edge 708 of the axle cap 706 of the hub 702. The bending of the arms 406 of the hooking mechanisms act to bias the hooking mechanism support structure 106 in the locked position once the wheel cover is attached to the wheel hub and the hooking mechanism support structure 106 is moved to the locked position.

In one embodiment, one or more spacing rings may be utilized for customization for the proper depth of the wheel cover in relation to the wheel edge. The one or more rings may have one or more clips and be sized to positively engage with the centered base of the wheel cover. The one or more rings may engage in a stacking-like manner.

In this manner, by pressing down on the hooking mechanism support structure 106, the wheel cover may be attached to the wheel hub. For example, a user of the wheel cover may orient the wheel cover over the wheel hub when the hooking mechanism support structure 106 is in the unlocked position. Once over the wheel hub, the user may press on the hooking mechanism support structure 106 to move the hooking mechanism support structure into the locked position (perhaps against the cover 204 of the second portion 200. This action moves the arms 406 of the hooking mechanisms 104, and in particular the hook portions 404) to move through the hook access holes 402 and engage on the backside edge 708 of the axle cap 706 of the hub 702. The hooks 404 operate to lock the hub wheel cover onto the hub. In general, the biasing of the arms 406 to hold the cover in the locked position over the hub is strong enough to allow the hub cover to remain in the locked position while the vehicle wheel is in operation. To remove the wheel cover, a user may simply pull up on the hooking mechanism support structure 106 to disengage the hooks 404 from the backside of the wheel hub and remove the wheel hub cover from around the wheel hub. Thus, the wheel hub cover described herein may be easily applied and removed from the wheel hub easily without the need for additional tools or connection mechanisms.

Described above are implementations of systems and methods for streamlining wheels. In one implementation, a hard cover with a centered base is mounted to a hub by way of one or more over center spring clips to the back edge of the axle cover or axel cap. Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A wheel cover system comprising:
a first portion comprising a mounting ring with a circumference larger than an axle cap of a wheel hub and a plurality of hooking mechanisms configured to engage a backside surface of the axle cap of the wheel hub; and
a second portion comprising a hub cover lying within an interior portion of the mounting ring;
wherein the first portion and the second portion are mounted onto the wheel hub through the plurality of hooking mechanisms engaging the backside surface of the axle cap of the wheel hub, the hooking mechanisms operable between an engaging position and a disengaging position through movement of a hooking mechanism support structure.

2. The wheel cover system of claim 1 wherein the plurality of hooking mechanisms each comprise an arm with a hooking end, each arm extending from the hooking mechanism support structure radially outwardly to an outer surface of the mounting ring.

3. The wheel cover system of claim 2 wherein the mounting ring further comprises a plurality of hook brackets disposed on the outer surface of the mounting ring, each of the plurality of hook brackets comprising a groove configured to guide the arm of one of the plurality of hooking mechanisms during engagement and disengagement of the hooking mechanisms.

4. The wheel cover system of claim 2 wherein the mounting ring further comprises a plurality of hook access holes, each of the plurality of hook access holes configured to receive the hooking end.

5. The wheel cover system of claim 4 wherein the hooking end of each arm of plurality of hooking mechanisms transition from outside the interior portion of the mounting ring in the disengaging position into the interior portion of the mounting ring in the engaging position through the plurality of hook access holes.

6. The wheel cover system of claim 2 wherein moving the hooking mechanism support structure toward the center of the mounting ring transitions the hooking mechanisms into the engaging position.

7. The wheel cover system of claim 6 wherein each arm of the plurality of hooking mechanisms bias the hooking mechanism support structure in the engaging position.

8. The wheel cover system of claim 2 wherein moving the hooking mechanism support structure away from the center of the mounting ring transitions the hooking mechanisms into the disengaging position.

9. The wheel cover system of claim 1 wherein the hub cover further comprises a plurality of bolt access holes to allow access to one or more bolts of the wheel hub through the bolt access holes.

10. A cover for a vehicle wheel comprising:
a mounting ring comprising an inner surface and an outer surface with a circumference larger than an axle cap of a wheel hub of a vehicle;
a hub cover lying within the inner surface of the mounting ring; and
a plurality of hooking mechanisms disposed on the outer surface of the mounting ring and configured to engage a backside surface of the axle cap of the wheel hub;
wherein the mounting ring and the hub cover are mounted onto the wheel hub through the plurality of hooking mechanisms engaging the backside surface of the axle cap of the wheel hub, the hooking mechanisms operable between an engaging position and a disengaging position through movement of an engagement mechanism.

11. The cover of claim 10 wherein the plurality of hooking mechanisms each comprise an arm with a hooking end, each arm extending from the engagement mechanism radially outwardly to the outer surface of the mounting ring.

12. The cover of claim 11 wherein the mounting ring further comprises a plurality of hook brackets disposed on the outer surface of the mounting ring, each of the plurality of hook brackets comprising a groove configured to guide the arm of one of the plurality of hooking mechanisms during engagement and disengagement of the hooking mechanisms.

13. The cover of claim 11 wherein the mounting ring further comprises a plurality of hook access holes, each of the plurality of hook access holes configured to receive the hooking end.

14. The cover of claim 13 wherein the hooking end of each arm of plurality of hooking mechanisms transition from outside an interior portion of the mounting ring in the disengaging position into the interior portion of the mounting ring in the engaging position through the plurality of hook access holes.

15. The cover of claim 11 wherein moving the engagement mechanism toward the center of the mounting ring transitions the hooking mechanisms into the engaging position.

16. The cover of claim 15 wherein each arm of the plurality of hooking mechanisms bias the engagement mechanism in the engaging position.

17. The cover of claim 11 wherein moving the engagement mechanisms away from the center of the mounting ring transitions the hooking mechanisms into the disengaging position.

18. The cover of claim 10 wherein the hub cover further comprises a plurality of bolt access holes to allow access to one or more bolts of the wheel hub through the bolt access holes.

* * * * *